United States Patent
Bi et al.

(10) Patent No.: US 7,990,855 B2
(45) Date of Patent: Aug. 2, 2011

(54) METHOD AND SYSTEM FOR JOINT REVERSE LINK ACCESS AND TRAFFIC CHANNEL RADIO FREQUENCY OVERLOAD CONTROL

(75) Inventors: Qi Bi, Morris Plains, NJ (US); Yang Yang, Morris Plains, NJ (US); Sigen Ye, Randolph, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 12/218,155

(22) Filed: Jul. 11, 2008

(65) Prior Publication Data
US 2010/0008229 A1   Jan. 14, 2010

(51) Int. Cl.
*H04W 28/02* (2009.01)
(52) U.S. Cl. .......................... 370/229; 370/230
(58) Field of Classification Search .................. 370/229, 370/230
See application file for complete search history.

(56) References Cited

U.S. PATENT DOCUMENTS

| | | | |
|---|---|---|---|
| 2004/0109426 A1* | 6/2004 | Veerepalli et al. | 370/335 |
| 2006/0291383 A1 | 12/2006 | Bi et al. | |
| 2007/0077938 A1 | 4/2007 | Bi et al. | |
| 2007/0225015 A1* | 9/2007 | Mueckenheim et al. | 455/453 |

FOREIGN PATENT DOCUMENTS

| | | |
|---|---|---|
| EP | 1489876 A1 | 12/2004 |
| WO | 2008008412 A2 | 1/2008 |

OTHER PUBLICATIONS

International Search Report for PCT/US2009/003620 dated Nov. 20, 2009.

* cited by examiner

*Primary Examiner* — Melvin Marcelo
(74) *Attorney, Agent, or Firm* — McCormick, Paulding & Huber

(57) ABSTRACT

A system for joint reverse link access and traffic channel overload control in a cellular network includes relieving the reverse link total loading to optimize resource utilization and distribution among different types of mobile device users. The cellular network includes a plurality of mobile stations that wirelessly communicate with a base station over a reverse link, using a CDMA or similar communications protocol. A joint access and traffic overload control module creates an access channel load relief plan, a traffic channel load relief plan and then relieves the total loading of the reverse link based upon both the access channel load relief plan and the traffic channel load relief plan.

17 Claims, 3 Drawing Sheets

METHOD AND SYSTEM FOR JOINT REVERSE LINK ACCESS AND TRAFFIC CHANNEL RADIO FREQUENCY OVERLOAD CONTROL

FIELD OF THE INVENTION

The present invention relates to telecommunications and, more particularly, to load control for wireless communications systems.

BACKGROUND OF THE INVENTION

FIG. 1 illustrates the topography of a typical cellular telecommunications network 10 (e.g., mobile phone network). The network 10 is geographically divided into a number of cells or sectors 12, which are typically contiguous and which together define the coverage area of the network 10. Each cell 12 is served by a base station 14, which includes one or more fixed/stationary transceivers and antennae 16 for wireless communications with a set of distributed mobile devices 18 (e.g., mobile phones, wireless PDA's, wireless devices with high-speed data transfer capabilities, "WiFi"-equipped computer terminals, and the like) that provide service to the network's users. The base stations 14 are in turn connected (either wirelessly or through land lines) to a mobile switching center ("MSC") or radio network controller ("RNC") 20, which serves a particular number of base stations depending on network capacity and configuration. The RNC 20 acts as the interface between the wireless/radio end of the network 10 and a public switched telephone network or other network(s) 22, including performing the signaling functions necessary to establish calls or other data transfer to and from the mobile devices 18.

Various methods exist for conducting wireless communications between the base stations 14 and mobile devices 18. One such method is the CDMA (code division multiple access) spread-spectrum multiplexing scheme, widely implemented in the United States under the "IS-95," "IS-2000," or other standards. While early systems were primarily configured for voice communications, technological improvements have enabled the development of "3-G" (third generation) networks, such as CDMA-based 1x-EVDO wireless networks (1x-EVDO is an implementation of the CDMA2000® "3-G" mobile telecommunications protocol/specification configured for the high-speed wireless transmission of both voice and non-voice data.) and similar wireless networks for both voice and high-speed packet data transfer. In a CDMA-based network, transmissions from the mobile devices 18 to the base stations 14 are across a single frequency bandwidth known as the reverse link 24, e.g., 1.25 MHz centered at a first designated frequency. Generally, each mobile device 18 is allocated the entire bandwidth all of the time, with the signals from individual mobile devices being differentiated from one another using an encoding scheme. Transmissions from the base stations 14 to the mobile devices 18 are across a similar frequency bandwidth (e.g., 1.25 MHz centered at a second designated frequency) known as the forward link 26. The forward and reverse links may each comprise a number of traffic channels and access or control channels, the former primarily for carrying data, and the latter primarily for carrying the control, synchronization, and other signals required for implementing CDMA communications.

In a CDMA network, the reverse link access and traffic channels share the same air interface resource, the reverse link rise over thermal ("RoT"). RoT is a ratio between the total power in the reverse link and the thermal noise power that is seen at the base station. High RoT causes mobile devices to transmit higher power to transfer the same amount of information over the traffic channels of the air interface. Additionally, High RoT increases the likelihood that mobile devices will need to retransmit access requests with greater power over the access channels to be recognized by the base station. In order to ensure proper CDMA operation within the wireless network, RoT is typically controlled within a certain target range, for example, between 3-5 dB.

To maintain RoT within the proper range, wireless networks are typically provided with some sort of RoT overload control. For example, one conventional overload control method used in circuit switched networks is to drop a certain number of existing voice calls to alleviate congestion. However, control by dropping calls impacts network service availability and user satisfaction.

Both reverse access channels and reverse traffic channels contribute to the RoT. However, the RoT contributions of the access channels are less controllable than those of the traffic channels because the access channels use a contention based or random access protocol, whereas the traffic channels are subject to system call administration, channel assignment and close-loop power control.

Typically, it is unpredictable whether the access channels or the traffic channels will contribute more to the RoT because it depends on the number of connected mobile devices as well as the type of connections. Accordingly, when high RoT is observed in the system, the system will either reduce traffic channel loading or reduce access channel loading. In conventional CDMA networks, these two control functions are independent of one another. For example, where many mobile devices attempt to access the network, the system will observe a surge in access activity and the access control will likely reduce the access amount, while the traffic channel control will not be triggered. This results in high access blockings, which can result in a delay in user access.

SUMMARY OF THE INVENTION

An embodiment of the present invention relates to a method for joint reverse link access and traffic channel overload control to optimize resource utilization and distribution among different types of users in cellular network. The cellular network has one or more base stations and a population of mobile devices. The method includes creating an access channel load relief plan. The access channel load relief plan may be created from information regarding the reverse link RoT, access channel activities, access channel operation rules and access channel capacity. The method also includes creating a traffic channel load relief plan. The traffic channel load relief plan may be created from information regarding the reverse link RoT, traffic channel activities and traffic channel capacity. Based on the access channel load relief plan and the traffic channel load relief plan, the total loading of the cellular network reverse link is reduced.

Another embodiment of the present invention relates to a system for controlling a total loading of a cellular network reverse link to optimize resource utilization and distribution among different types of users. The system includes a joint access/traffic coordination controller that controls the total loading of the cellular network reverse link. An access overload controller provides an access channel load relief plan to the joint access/traffic coordination controller, and a traffic overload controller provides a traffic channel load relief plan to the joint access/traffic coordination controller. The joint access/traffic coordination controller relieves the total loading of the cellular network reverse link based on the access channel load relief plan and the traffic channel load relief plan.

BRIEF DESCRIPTION OF THE DRAWINGS

The present invention will be better understood from reading the following description of non-limiting embodiments, with reference to the attached drawings, wherein below.

DETAILED DESCRIPTION

Figure 1:
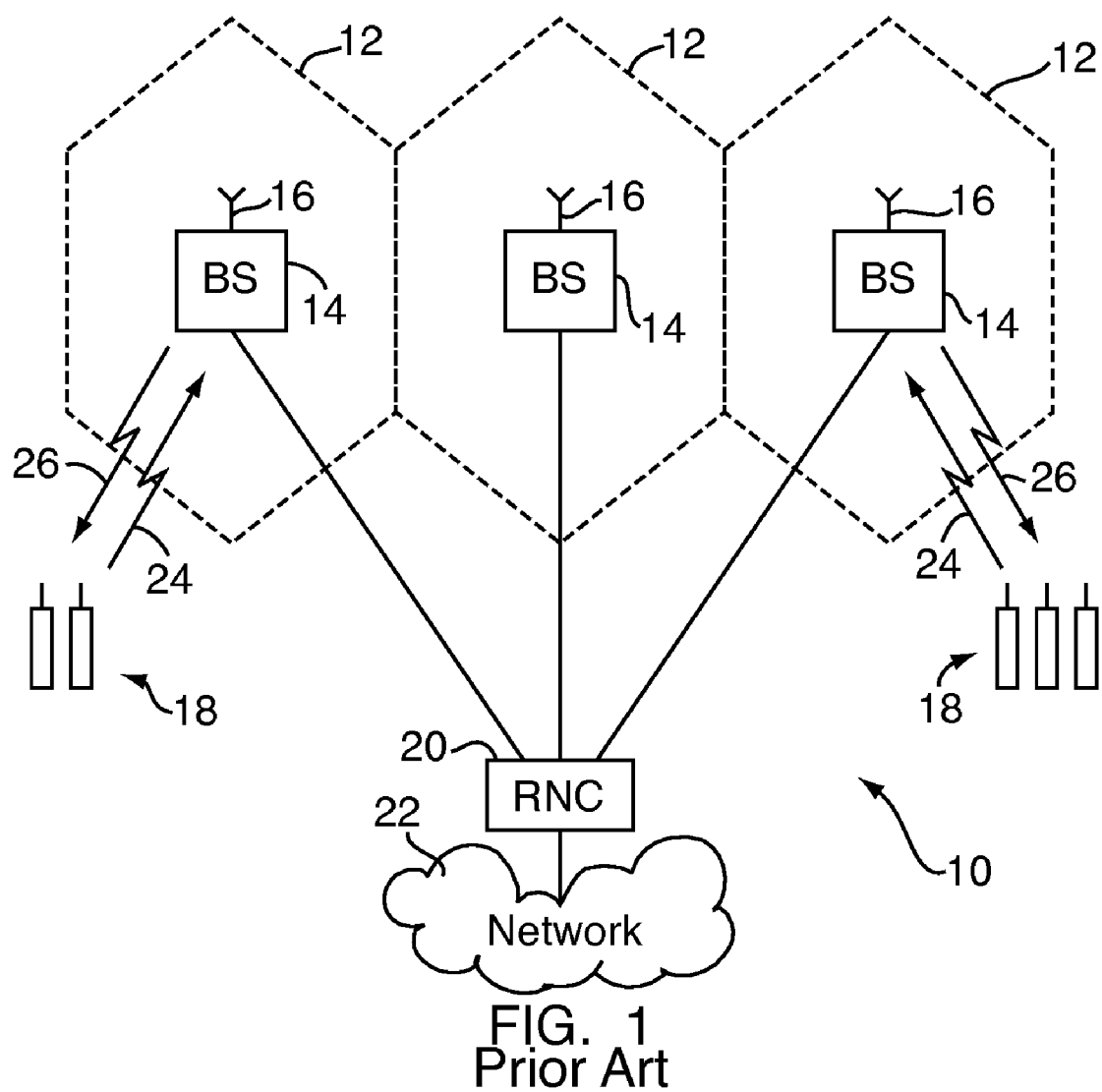
FIG. 1 is a schematic diagram of a cellular telecommunications network according to the prior art.
Figure 2:
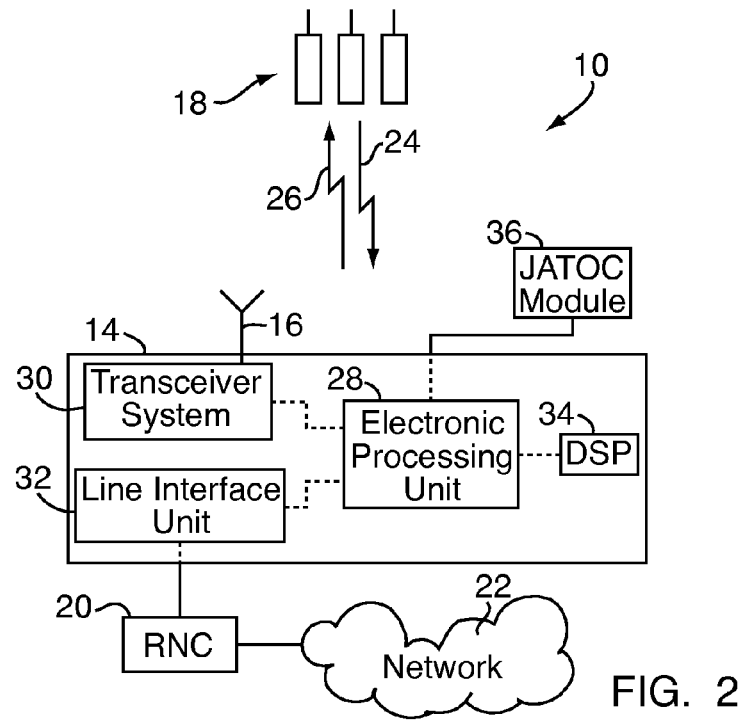
FIG. 2 is a schematic diagram of a cellular network according to an embodiment of the present invention.

Referring to FIG. 2, an embodiment of the present invention relates to a method and system for joint reverse link access and traffic channel overload control to optimize resource utilization and distribution among different types of users in cellular network. The cellular network 10 includes one or more base stations 14 that wirelessly communicate with a number of mobile devices 18 over a reverse link 24 (i.e., mobile device to base station link) and a forward link 26 (i.e., base station to mobile device link) according to a CDMA or other communications protocol.

The mobile devices 18 may include, for example, mobile phones, wireless PDA's, wireless devices with high-speed data transfer capabilities, such as those compliant with "3-G" or "4-G" standards, "WiFi"-equipped computer terminals, and the like.

As indicated in FIG. 2, the base station 14 will typically be connected to an RNC 20, which will in turn be connected to additional base stations (not shown) and one or more networks 22.

Among other possible components, each base station 14 may include one or more electronic processing units 28, a transceiver system 30 (e.g., fixed/stationary transceivers and antennae), a line interface unit ("LIU") 32, and one or more digital signal processors ("DSP") 34. These components are configured to operate in cooperation to carry out wireless communications with a set of distributed mobile devices 18 (e.g., mobile phones) that provide service to the network's users. The LIU 32 acts as a communication interface between the base station 14 and RNC 20, for the transfer of data therebetween. In conjunction with the DSP 34, the processing unit 28 processes data as required according to the communication protocols in place on the network. The transceiver system 30 includes a number of antennae 16 for receiving and transmitting radio frequency ("RF") signals, and various electrical sub-components for modulating data signals at radio frequency levels for transmission and reception over the forward and reverse links, respectively.

The cellular network 10 of the present invention additionally includes a joint access and traffic overload control module ("JATOC module") 36 to control the loading of the reverse link 24. The JATOC module 36 may be implemented as a hardware module, hardware/software module, or software module (e.g., script or other software program, or suite of software programs), in a standalone manner, communicating with one or more network components (e.g. the base stations 14 and RNC 20). For example, as shown in FIG. 2, the JATOC module 36 communicates with the base station 14 to control loading of the reverse link 24. Alternatively, the JATOC module 36 may be integrated directly with the processing units and/or with one or more network components (e.g., the base stations 14 and RNC 20), for carrying out the method described herein.

Figure 3:
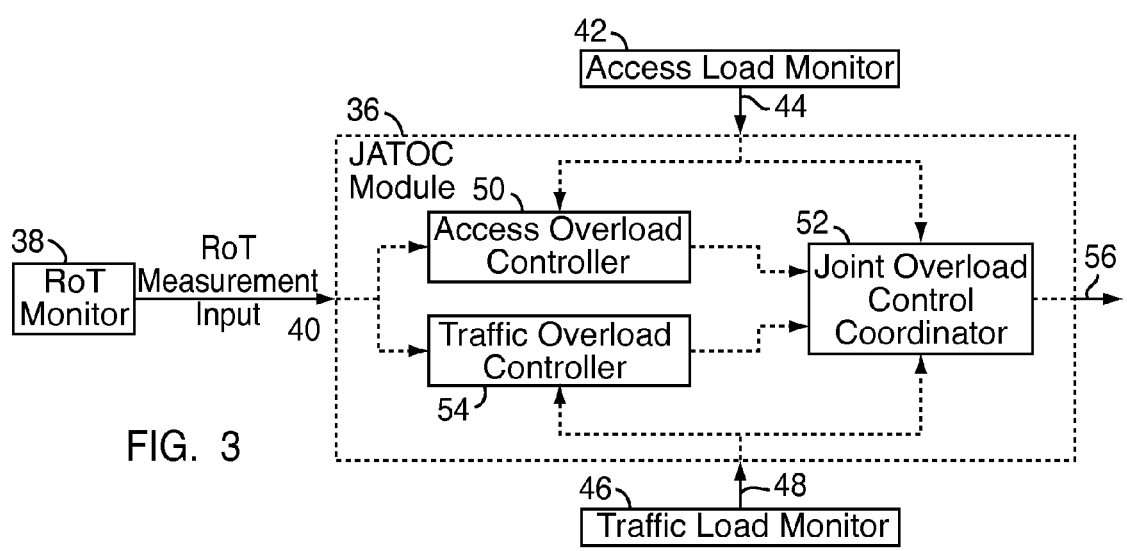
FIG. 3 is a schematic diagram of a joint access and traffic overload control module according to an embodiment of the present invention.

FIG. 3 illustrates the JATOC module 36, according to the present invention, for controlling the total loading of the cellular network reverse link 24. Total loading of the cellular network reverse link 24 is the loading of both the reverse link traffic channels and the reverse link access channels. The JATOC module 36 receives input regarding the loading of the reverse link traffic channels and the reverse link access channels and determines the load relief actions for controlling the total reverse link loading.

An RoT monitor 38 monitors the total energy received from the antennae 16, as shown in FIG. 2, calculates the RoT and provides RoT measurement input 40 to the JATOC module 36. In carrying out radio communications, the mobile devices 18 transmit various traffic (i.e., data/voice) signals and access (i.e. control/system) signals over the reverse link 24 to the base station 14. For example, a typical mobile device might have a maximum transmit power of no more than 500 mW, and more typically around 200 mW. The transmit power, reduced by a factor proportional to the distance between the mobile station and base station, is received at the base station's antenna(s) 16. The radio frequency power present at the base station antenna 16, as received from all the mobile devices 18 in the cell or sector 12 in the aggregate, provides the total energy measurement. Additionally, the total energy measurement includes the power received from mobile devices that are controlled and/or located in other sectors and cells of the network, plus thermal noise, plus any other in-band interference. The total energy measurement can be denoted in units of: 1) power in milliwatts ($P_{mW}$); 2) dBm (decibel milliwatts), where dBm=10 log ($P_{mW}$); or 3) an integer, e.g., from a scale that corresponds to an expected or typical range of power at the antenna. The key indicator of loading on the reverse link is not the absolute value of the energy, but the RoT, which is the rise of the total energy relative to a baseline unloaded value, which is measured when the system has close to zero reverse link loading, e.g., few or no active mobile devices. As an example, an RoT<5 dB might be considered as low, while an RoT>5 dB might be considered as high, i.e., indicative of a substantially increased load on the reverse link.

An access load monitor 42 monitors the reverse link access channel activities. For example, the access load monitor 42 may monitor the number of access probes detected within the sector 12, which are repeatedly transmitted by the mobile devices 18 when the mobile devices 18 initiate an access request to the base station 16 to acquire a reverse link signal. Similarly, the access load monitor 42 may also monitor the number of access probes transmitted for a given access request, since access probes are continually transmitted from a mobile device until the access request is granted. The access load monitor 42 may also monitor the type of access requests received by the base station 16 or other similar access channel activities. The access load monitor 42 is able to estimate the access channel loading using the access channel activity information and the access channel operation rules. The access load monitor 42 may then compare the access channel loading against the access channel capacity. Additionally, the access load monitor 42 may monitor the access activity associated with a particular mobile device 18, which can be used to determine whether it is more resource efficient to keep the particular mobile device 18 in an idle state. The access load monitor 42 uses the estimate of access channel loading to provide access loading input 44 to the JATOC module 36.

A traffic load monitor 46 monitors the reverse link traffic channel activities. For example, the traffic load monitor 46 may monitor the number of active connections within the sector 12, the amount of traffic channel resources occupied within the sector 12 and the power control status of each connection. Additionally, since data is transmitted from the mobile device 18 in packet form, the traffic load monitor 46 may monitor the traffic channel packet arrival rate from each active connection and the associated data rates of those packets. The traffic load monitor 46 is able to estimate the traffic channel loading using the traffic channel activity information, which the traffic load monitor then compares against the traffic channel capacity. Additionally, the traffic load monitor 46 may monitor the traffic activity associated with a particular mobile device 18, which can be used to determine whether it is more resource efficient to keep the particular mobile device 18 in the traffic channel. The traffic load monitor 46 uses the estimate of traffic channel loading to provide traffic loading input 48 to the JATOC module 36.

Figure 4:
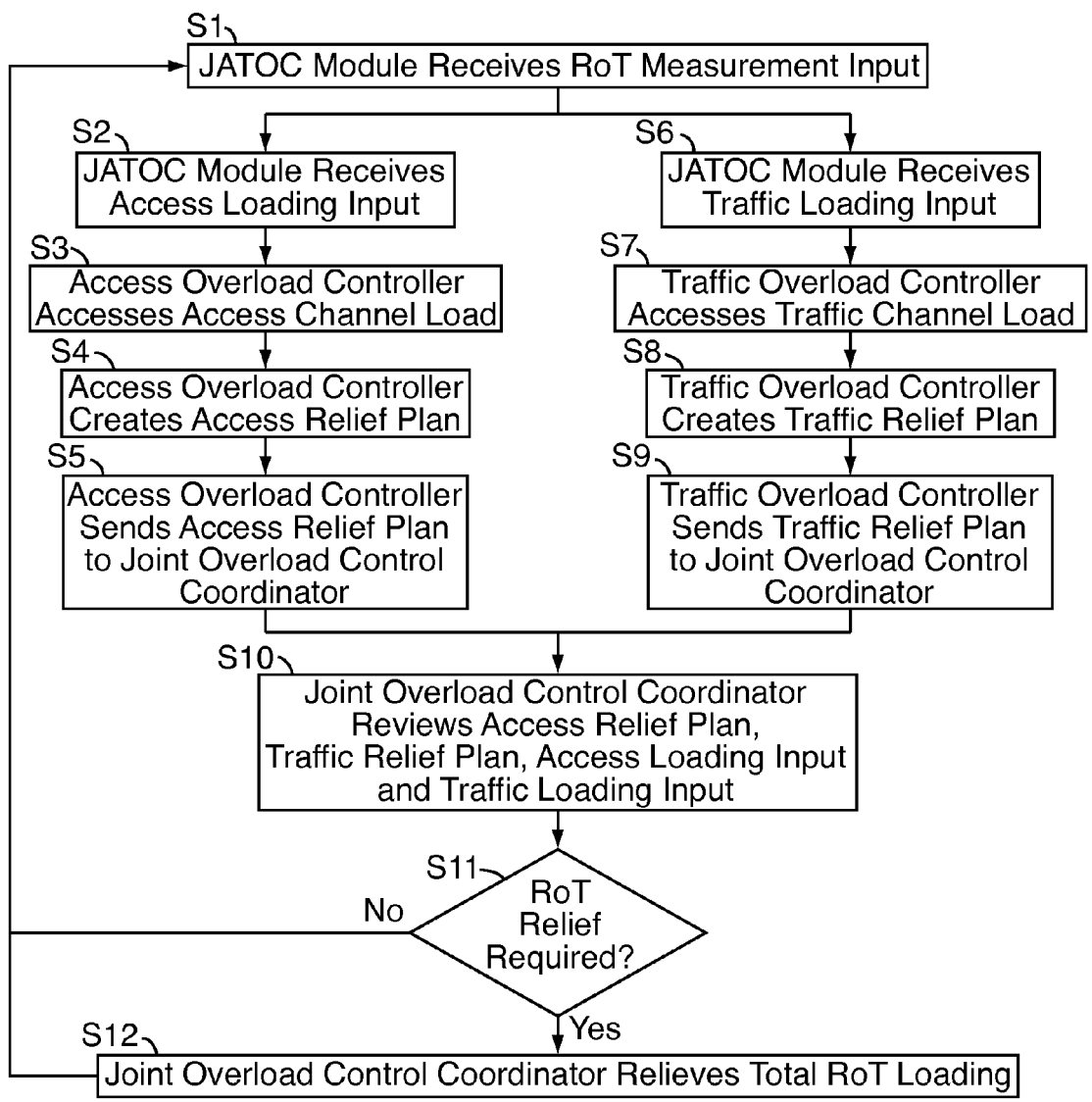
FIG. 4 is a flowchart illustrating a method of joint access and traffic overload control according to an embodiment of the present invention.

The JATOC module 36 has an access overload controller 50 for planning load relief necessary for the reverse link access channel. Referring to FIG. 4, the access overload controller 50 receives the RoT measurement input 40 from the RoT monitor 38 in step S1 and receives access loading input 44 from the access load monitor 42 in step S2. Using the RoT measurement input 40 and the access loading input 44, in step S3, the access overload controller 50 determines if current access channel activities need to be relieved. In step S4, the access overload controller 50 then develops an access channel relief plan to achieve the necessary access channel relief. For example, the access channel relief plan may include delaying or blocking selective mobile devices 18 access activities, adjusting the user transmission power for access or other similar actions resulting in lowered access channel loading. If no access channel relief is needed, the access channel relief plan may simply indicate that no access channel relief is necessary. In step S5, the access overload controller 50 outputs the access channel relief plan to the JATOC module's joint overload control coordinator 52, which determines a final overload control action 56 to be taken to relieve the reverse link loading.

Referring back to FIG. 3, the JATOC module 36 also has a traffic overload controller 54 for planning load relief necessary for the reverse link traffic channel. Referring to FIG. 4, the traffic overload controller 54 receives the RoT measurement input 40 from the RoT monitor 38 in step S1. In step S6, the traffic overload controller 54 receives traffic loading input 48 from the traffic load monitor 46. Using the RoT measurement input 40 and the traffic loading input 48, in step S7, the traffic overload controller 54 determines if current traffic channel activities need to be relieved. The traffic overload controller 54 then develops a traffic channel relief plan to achieve the necessary traffic channel relief in step S8. For example, the traffic channel relief plan may include reducing the allowable traffic channel data rates, blocking new traffic channel connections, disconnecting some existing traffic channel connections or other similar actions resulting in lowered traffic channel loading. If no traffic channel relief is needed, the traffic channel relief plan may simply indicate so. In step S9, the traffic overload controller 54 outputs the traffic channel relief plan to the joint overload control coordinator 52 for use in determining the final overload control action 56 to be taken to relieve the reverse link loading.

Referring back to FIG. 3, the JATOC module 36 includes the joint overload control coordinator 52 for determining the final overload control action 56 to be taken to relieve the total reverse link loading. Referring to FIG. 4, to determine the final overload control action 56 for relieving the reverse link total loading and achieve a desired system behavior, in step S10, the joint overload control coordinator 52 uses the access channel relief plan provided by the access overload controller 50, the traffic channel relief plan provided by the traffic channel overload controller 54, the access loading input 44 provided by the access load monitor 42 and the traffic loading input 48 provided by the traffic load monitor 46. If no reverse link load relief is needed, i.e. the answer to step S11 is no, no action is taken and the system continues to monitor RoT. If reverse link load relief is needed, i.e. the answer to step S11 is yes, the joint overload coordinator 52 then implements the final overload control action 56, in step S12, thereby relieving the reverse link total loading. The final overload control action 56 may include relieving access channel loading, traffic channel loading, or some combination of both access and traffic channel loading.

When implemented in a wireless network 10, as seen in FIG. 2, the JATOC module 36 is able to control reverse link loading better than conventional control systems. For example, in an emergency situation, where many mobile devices attempt to access the network 10, the network 10 will observe a surge in access activity. Unlike the conventional control systems discussed above, the JATOC module 36 will consider both current access loading and current traffic loading in implementing the final overload control action 56. Thus, rather than merely reducing the access loading, the system may instead reduce traffic loading that is not of an emergency nature, thereby leaving more reverse link shared RF resources for the emergency access usage.

Similarly, when many active users are connected to the wireless network 10 and the network 10 observes reverse link overload, the conventional traffic channel overload control will relieve users from RF connections to relieve the traffic loading. However, in many situations, the users who have been removed from the wireless network 10 will immediately request access again. If the access channel is already heavily loaded, these additional requests may increase the network loading to be greater than if no action had been taken at all. The JATOC module 36 would instead consider both the traffic loading and the access loading before implementing the final overload control action 56. Thus, the JATOC module 36 may implement a plan that only reduces traffic loading when the access channel is not highly loaded.

Accordingly, when implemented, the JATOC module 36 achieves optimal resource utilization and distribution among different types of mobile device users by considering the interactions of the access and traffic reverse link channels. Thus, the JATOC module 36 improves sharing of the reverse link RF resources and eliminates undesirable network behavior.

As should be appreciated, the present invention is applicable to all transmissions across the reverse link, be they voice, data, or voice/data transmissions.

Since certain changes may be made in the above-described method and system for joint reverse link access and traffic channel RF overload control, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A cellular network comprising:
   one or more mobile devices that wirelessly communicate with a base station over a reverse link; and
   a joint access and traffic overload control module that communicates with the base station to control a total loading of the reverse link; wherein:
   the total loading of the reverse link includes both a loading of an access channel and a loading of a traffic channel;
   the joint access and traffic overload control module controls the total loading of the reverse link using both access loading input and traffic loading input;
   the joint access and traffic overload control module controls the total loading of the reverse link based on an effect that dropping a call from the traffic channel has on the loading of the access channel; and
   a rise over thermal (RoT) monitor connected to the joint access and traffic control module monitors RoT of both the access channel and the traffic channel of the reverse link and provides RoT measurement input to the joint access and traffic control module.

2. The cellular network according to claim 1, wherein the joint access and traffic overload control module is a software module.

3. The cellular network according to claim 1, wherein the joint access and traffic overload control module is a hardware module.

4. The cellular network according to claim 1, wherein the joint access and traffic overload control module is integral with the base station.

5. The cellular network according to claim 1, wherein the joint access and traffic overload control module is integral with a radio network controller that is connected to the base station.

6. The cellular network according to claim 1, wherein the RoT monitor is integral with the base station.

7. The cellular network according to claim 1, wherein an access load monitor connected to the joint access and traffic control module monitors access channel loading of the reverse link and provides access loading input to the joint access and traffic control module.

8. The cellular network according to claim 1, wherein a traffic load monitor connected to the joint access and traffic control module monitors traffic channel loading of the reverse link and provides traffic loading input to the joint access and traffic control module.

9. A cellular network reverse link control module comprising:
   a joint overload control coordinator that controls the total loading of the cellular network reverse link, the total loading of the reverse link including both a loading of an access channel and a loading of a traffic channel;
   a rise over thermal (RoT) monitor that provides a RoT measurement input of both the access channel and the traffic channel to the joint overload control coordinator;
   an access overload controller for providing an access channel load relief plan to the joint overload control coordinator; and
   a traffic overload controller for providing a traffic channel load relief plan to the joint overload control coordinator;
   wherein the joint overload control coordinator relieves the total loading of the cellular network reverse link by relieving the access channel loading, the traffic channel loading or a combination thereof based on the RoT measurement input, the access channel load relief plan, the traffic channel load relief plan and an effect that dropping a call from the traffic channel has on the loading of the access channel;
   wherein the cellular network reverse link control module is implemented in a computing apparatus.

10. The control module according to claim 9, wherein the RoT monitor is a base station.

11. The control module according to claim 9, wherein the control module is adapted to receive access loading input from an access load monitor.

12. The control module according to claim 9, wherein the control module is adapted to receive traffic loading input from a traffic load monitor.

13. A method for controlling a total loading of a cellular network reverse link, the total loading including both a loading of an access channel and a loading of a traffic channel, said method comprising the steps of:
   generating an access channel load relief plan, including:
      inputting access load input; and
      inputting a rise over thermal (RoT) measurement input of both the access channel and the traffic channel;
   generating a traffic channel load relief plan; and
   relieving total loading of the cellular network reverse link based on the RoT measurement input, the access channel load relief plan, the traffic channel load relief plan and an effect that dropping a call from the traffic channel has on the loading of the access channel.

14. The method according to claim 13, additionally comprising the step of calculating an access loading of the reverse link.

15. The method according to claim 13, additionally comprising the step of calculating a traffic loading of the reverse link.

16. A method for controlling a total loading of a cellular network reverse link, the total loading including both a loading of an access channel and a loading of a traffic channel, said method comprising the steps of:
   generating an access channel load relief plan;
   generating a traffic channel load relief plan, including:
      inputting traffic load input; and
      inputting rise over thermal (RoT) measurement input of both the access channel and the traffic channel; and
   relieving total loading of the cellular network reverse link based on the RoT measurement input, the access channel load relief plan, the traffic channel load relief plan and an effect that dropping a call from the traffic channel has on the loading of the access channel.

17. A method for controlling a total loading of a cellular network reverse link, the total loading including both a loading of an access channel and a loading of a traffic channel, said method comprising the steps of:
   generating an access channel load relief plan;
   generating a traffic channel load relief plan;
   calculating a rise over thermal (RoT) of both the access channel and the traffic channel; and
   relieving total loading of the cellular network reverse link based on the RoT measurement input, the access channel load relief plan, the traffic channel load relief plan and an effect that dropping a call from the traffic channel has on the loading of the access channel.

* * * * *